May 5, 1959 L. E. AUSTIN ET AL 2,885,063
UNLOADER MECHANISM
Original Filed March 2, 1955 10 Sheets-Sheet 1

INVENTORS
JOHN H. ETTINGER
ARTHUR K. BROWN JR.
LEONARD E. AUSTIN
BY-
ATTORNEY

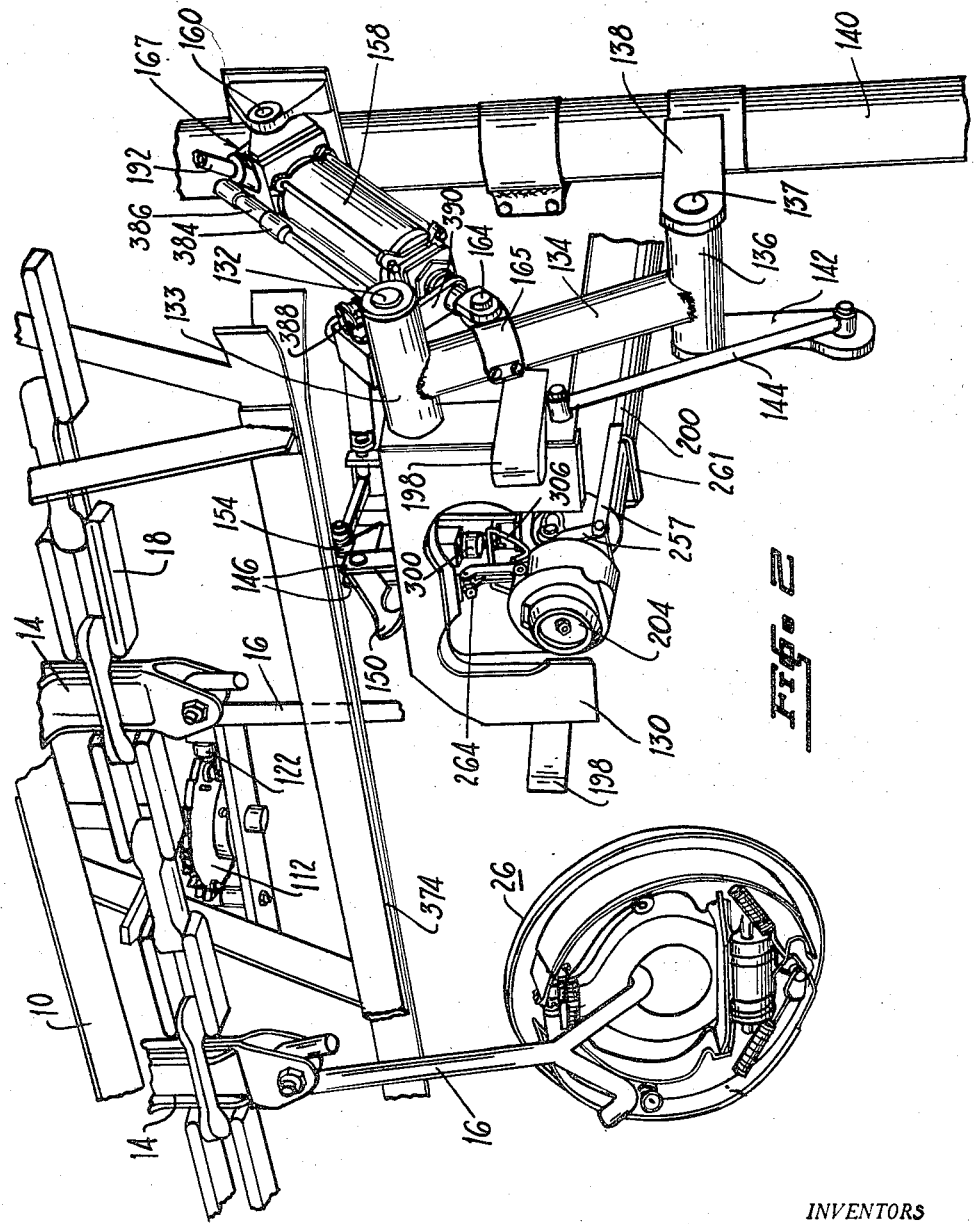

May 5, 1959 L. E. AUSTIN ET AL 2,885,063
UNLOADER MECHANISM
Original Filed March 2, 1955 10 Sheets-Sheet 3

INVENTORS
JOHN H. ETTINGER
ARTHUR K. BROWN JR.
LEONARD E. AUSTIN
BY-
ATTORNEY

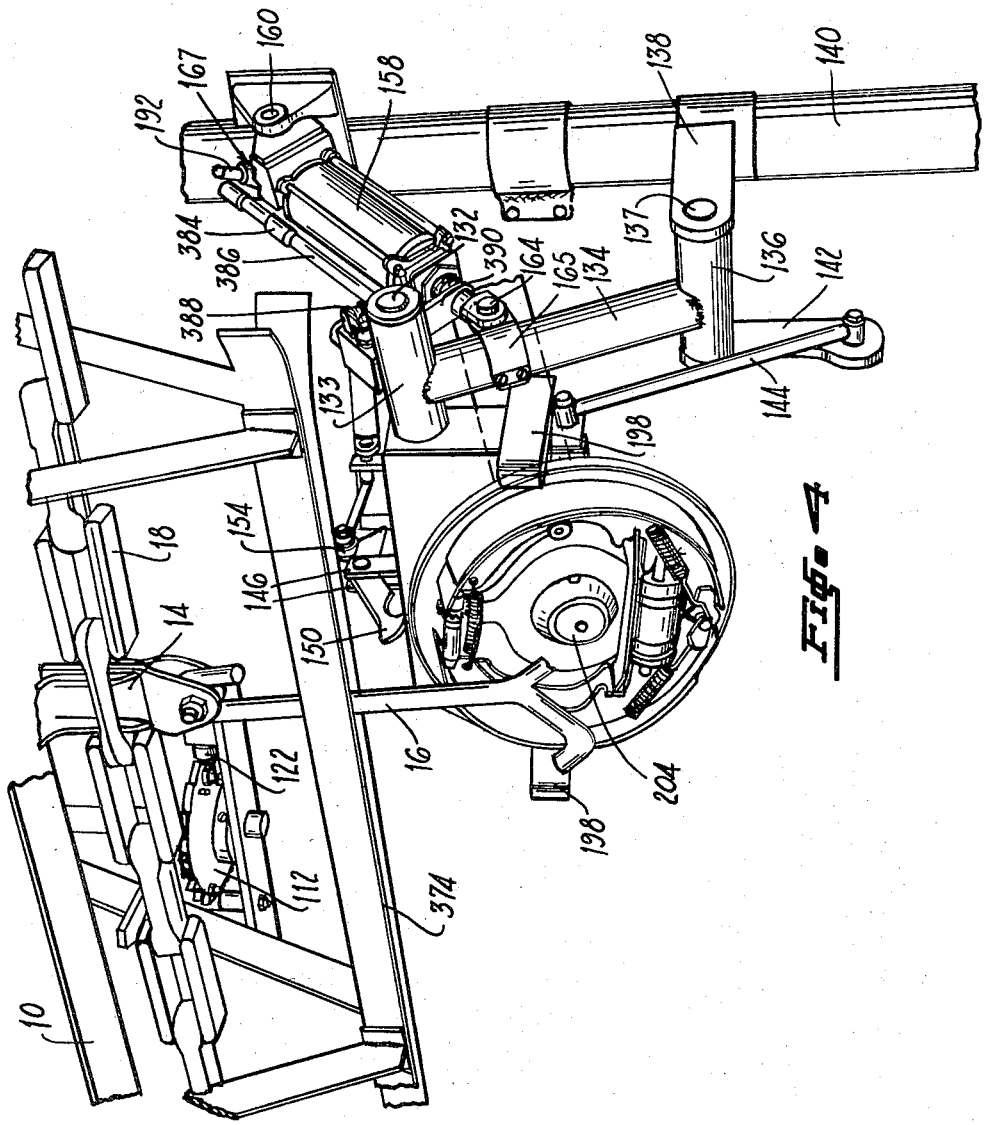

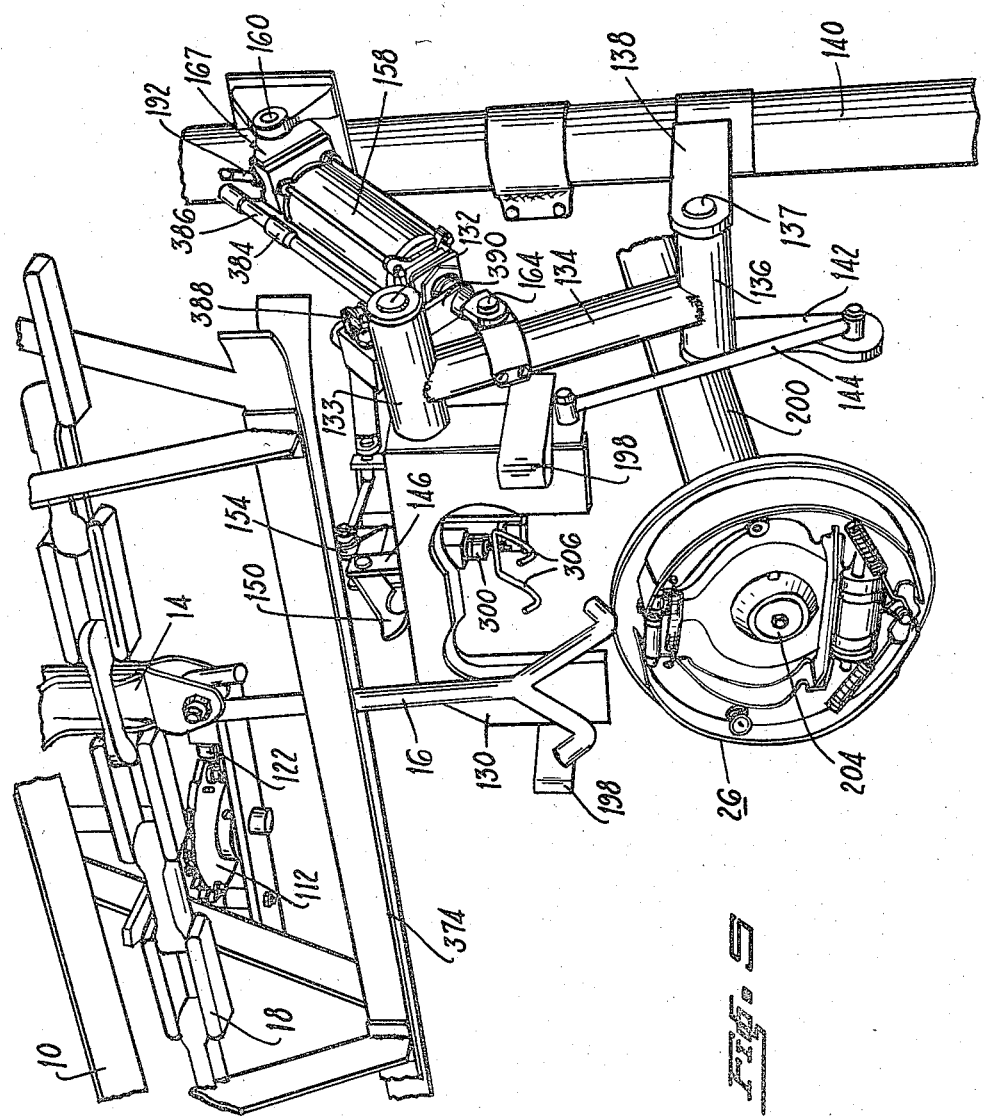

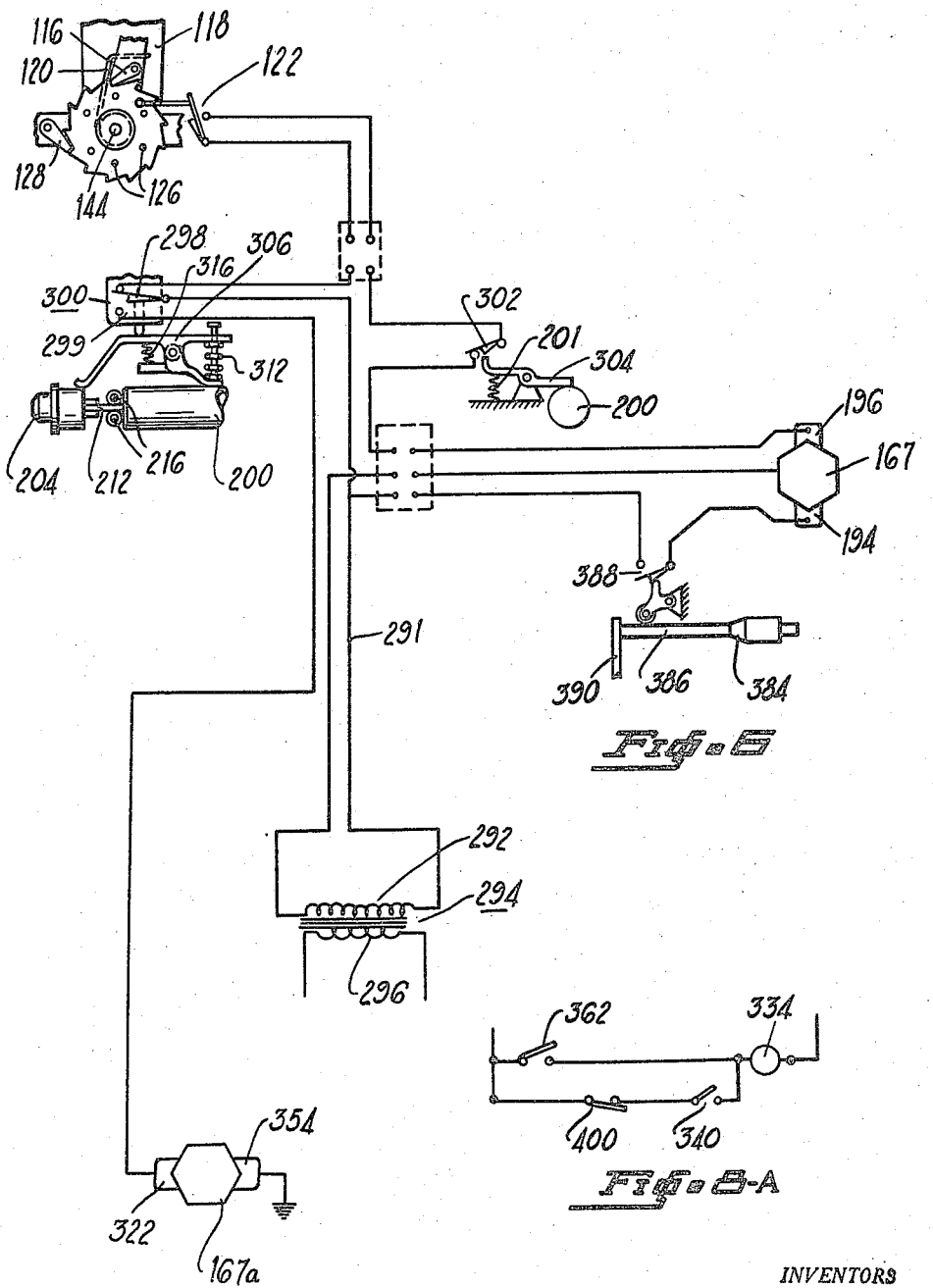

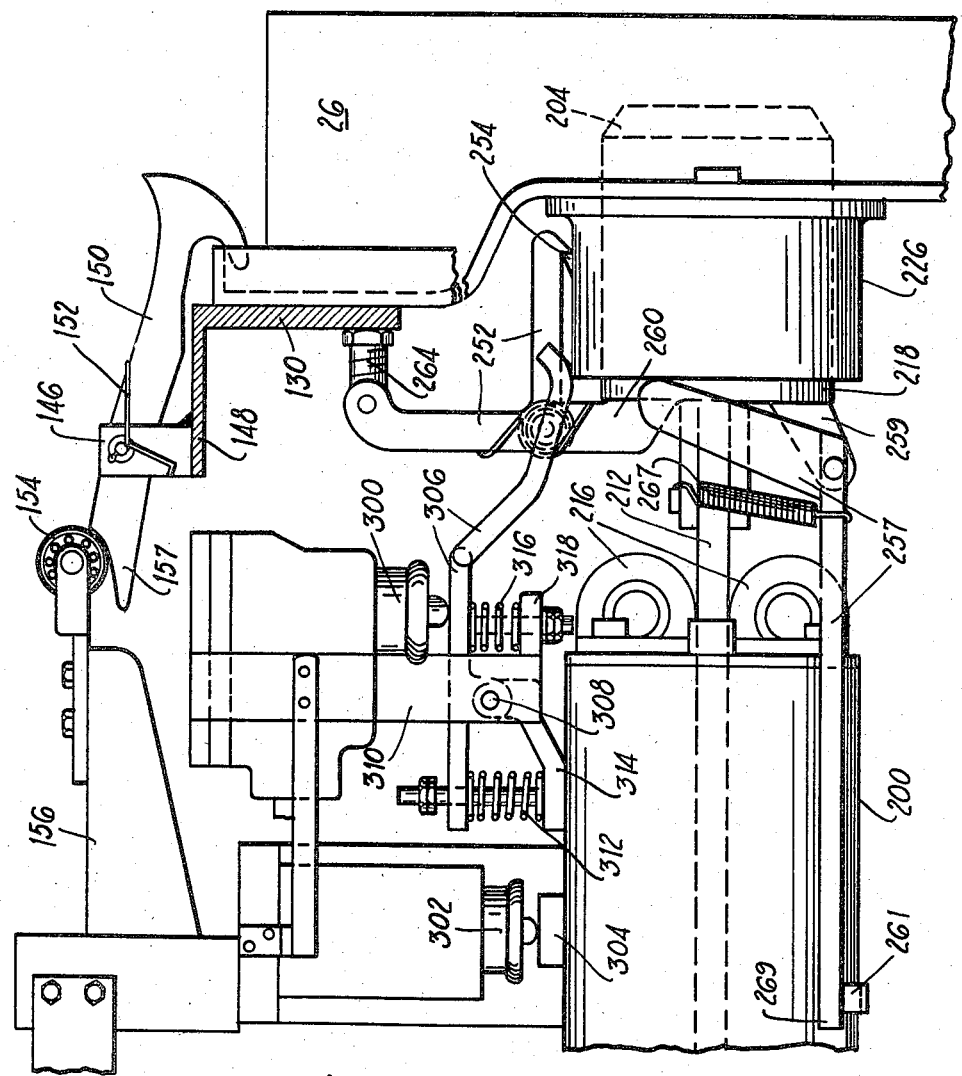

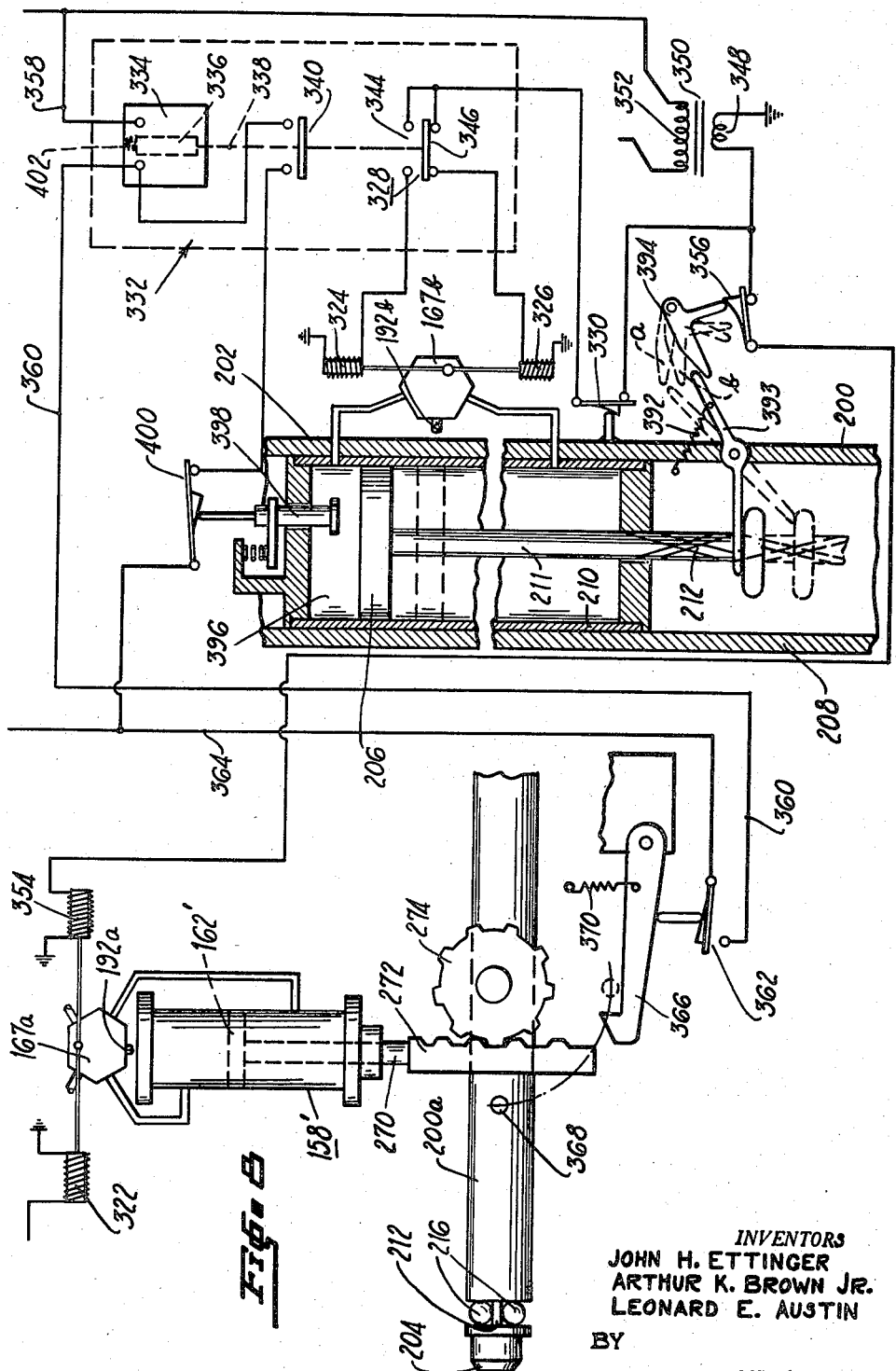

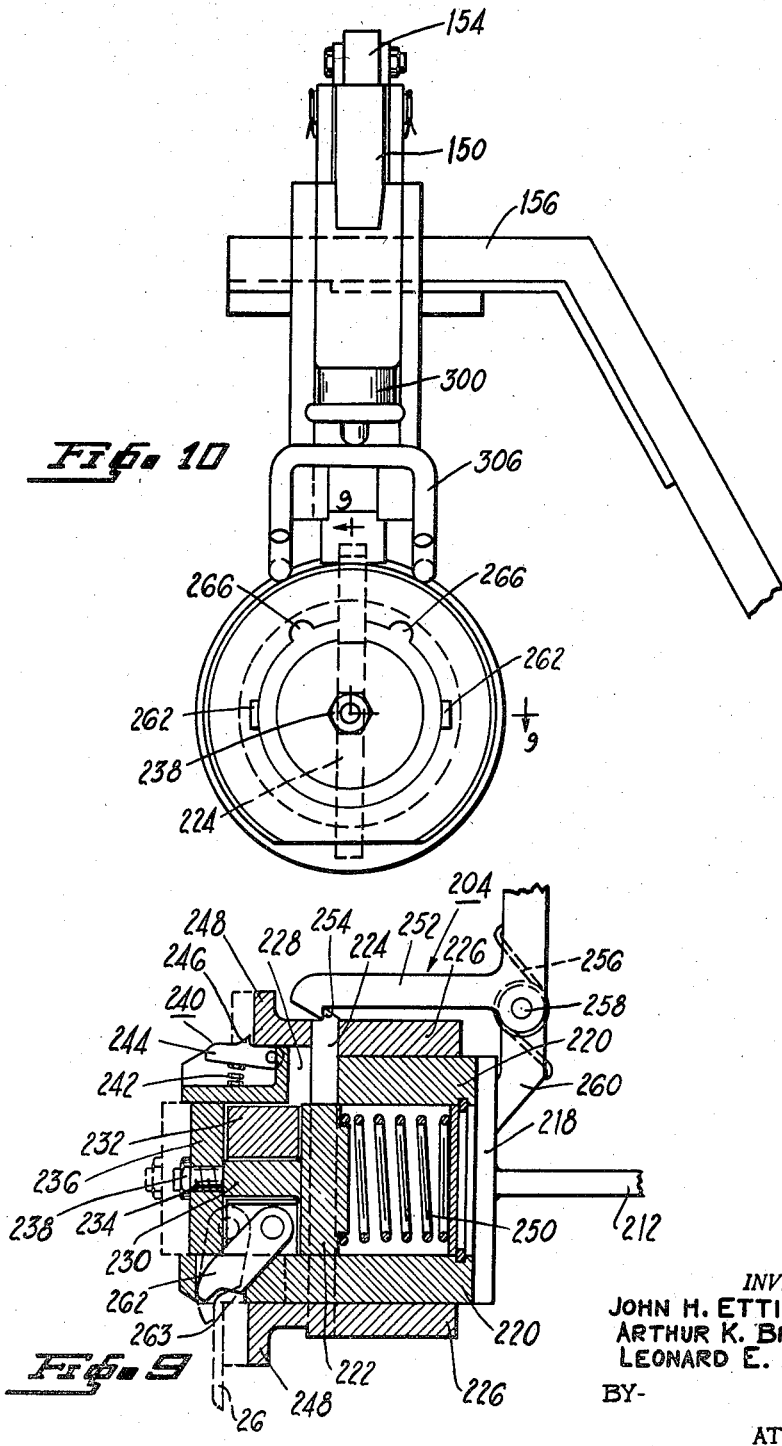

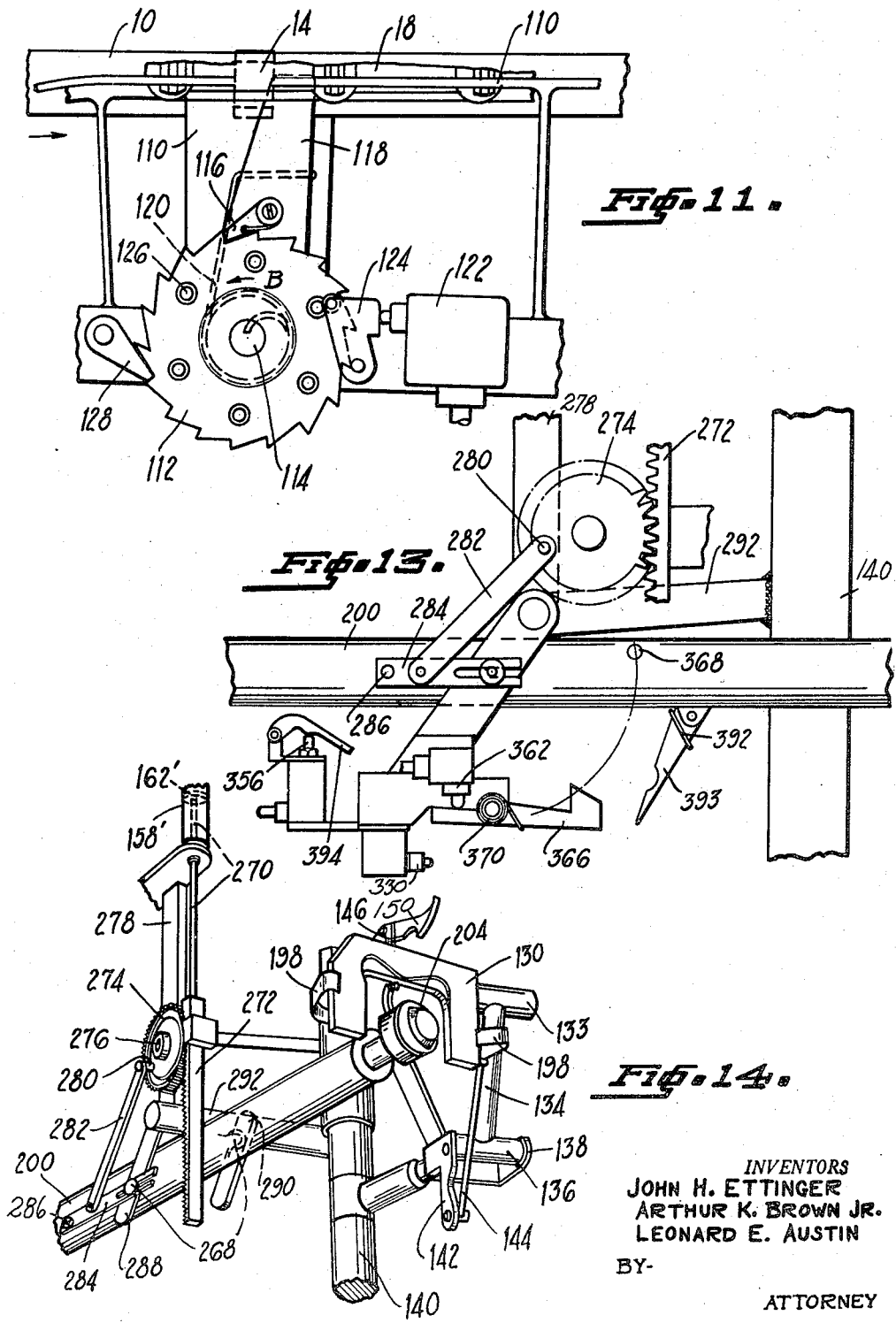

United States Patent Office 2,885,063
Patented May 5, 1959

2,885,063
UNLOADER MECHANISM

Leonard E. Austin, Arthur K. Brown, Jr., and John H. Ettinger, South Bend, Ind., assignors to Bendix Aviation Corporation, South Bend, Ind., a corporation of Delaware Original application March 2, 1955, Serial No. 491,738, now Patent No. 2,849,101, dated August 26, 1958. Divided and this application July 30, 1956, Serial No. 601,043

3 Claims. (Cl. 198—177)

This invention, which is disclosed in our Austin et al. parent application Serial No. 491,738 filed March 2, 1955, now Patent No. 2,849,101, relates in general to means for selectively unloading power operated conveyors and in particular to a means of this type for unloading a plurality of different units, such as several types of automotive brakes from the carriers of a conveyor. The instant application is accordingly a division of the above identified parent application.

There is a need in this art for an automatically operated mechanism operable to load a conveyor with a plurality of types of products, said products being then conveyed to the unloader mechanism which selects and deposits the product at a desired station. The mechanism described in this specification meets this need, for with said mechanism a plurality of types of brakes for other units are selectively loaded on a conveyor, and then transported to another place there to be selectively unloaded and deposited at the desired stations.

There is disclosed in this application a plurality of loader mechanisms together with corresponding unloader mechanisms, said mechanisms being cooperable with a single conveyor system, said system comprising an endless conveyor carrying a plurality of carrier units. However, the invention of this divisional application resides in the unloader mechanism of this combination.

Accordingly, the principal object of our invention is to provide a relatively simple, compact and effective power operated unloader mechanism for selectively unloading, from certain ones of a plurality of carrier units of a conveyor, units being conveyed; for example, brake units of certain makes.

Yet another object of our invention is to provide an unloader mechanism, comprising a plurality of power operated unloader units, for sequentially unloading a plurality of different units from the carrier units of a conveyor mechanism said operation being effective in a certain area of a manufacturing plant.

Another object of our invention is to provide, in combination with a power driven conveyor mechanism having a plurality of chain driven carrier units, a relatively simple power operated mechanism for unloading a plurality of types of units from said carrier units.

An object of our invention is, generally speaking, to provide a mechanism of the aforementioned type which shall be automatic in its entire operation and require no duty on the part of the attendant beyond removing from the mechanism the work unit filled cartons or other containers.

Yet another object of our invention is to provide an unloader mechanism of the above mentioned character which is accurate and reliable in operation.

Yet another object of our invention is to provide a mechanism of the class referred to which is so constructed as to operate rapidly and efficiently with a minimum possibility of damage being done to parts of the mechanism; and requiring a minimum of attention by the attendant in charge.

Other objects and advantages of the present invention will become apparent during the following description of one embodiment of our invention, reference being had therein to the accompanying drawings, in which:

Figure 2 is a view disclosing, in perspective, the principal features of the unloader unit of our invention the brake to be unloaded being shown approaching a position opposite the brake receiving yoke;

Figure 4 is a view, similar to Figures 2 and 3, disclosing the brake unit mounted on the nose of the tube unit of our invention, the position it takes shortly after being dropped from the hook of the yoke mechanism;

Figure 5 is a view, similar to Figures 2, 3 and 4, disclosing the tube with the brake unit mounted on its end, the tube having moved downwardly somewhat toward its vertical position;

Figure 6 is a diagrammatic view disclosing most of the principal electrical controls of the unloader unit of our invention;

Figure 12:
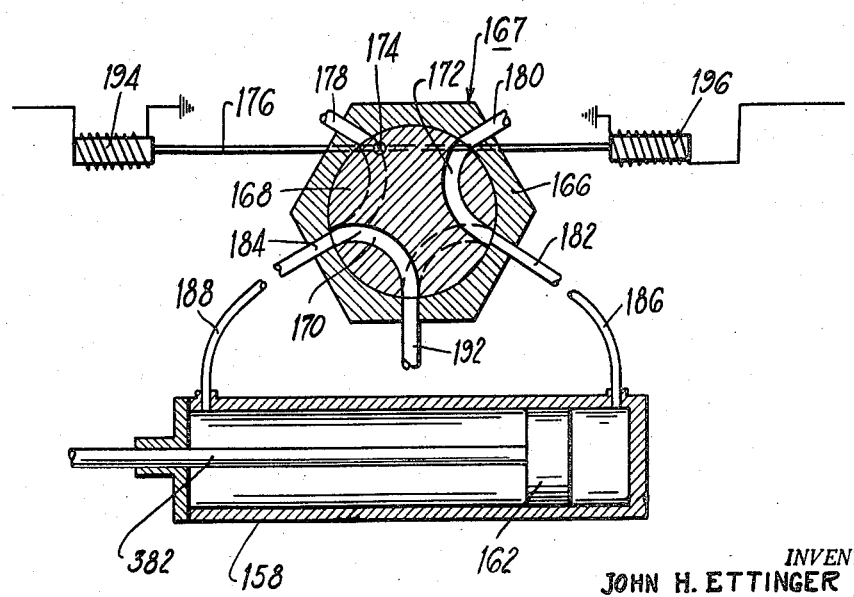
Figure 3:
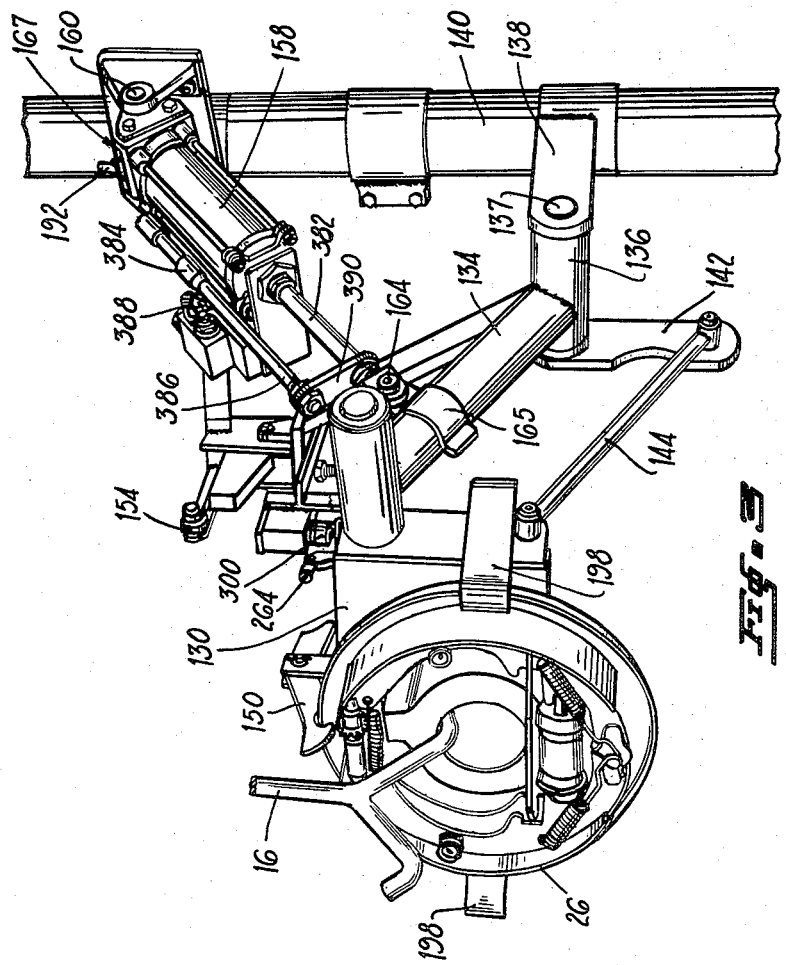
Figure 3 is a view, similar to Figure 2, disclosing the yoke of our mechanism in the act of picking up the brake unit being unloaded.

Figure 7 discloses, in general outline, the nose portion of the brake receiving tube of the unloader unit together with some of the electrical controls and a part of the yoke mechanism;

Figure 8 is a diagrammatic view disclosing, in section, the nose operating motor housed within the tube of our invention, together with the motor for rotating the tube, and controls for said motors;

Figure 8a is a view disclosing a part of the electrical hookup of the hold down relay of the mechanism of our invention;

Figure 9 is a sectional view, taken on the line 9—9 of Figure 10, disclosing details of the nose unit of the brake holding tube of our invention;

Figure 10 is a view looking into the brake holding end, that is nose end, of the tube of our invention;

Figure 11 is a view disclosing details of the signal switch operating mechanism of the unloader unit of our invention;

Figure 12 is a sectional view disclosing details of the pressure differential operated motor of our invention, and the solenoid operated valve for controlling said motor;

Figure 13 discloses part of the mechanism for imparting an angular rotation of the tube of our invention, and this view also discloses three of the switch operating means of the controls of the unloader unit; and Figure 14 is a view disclosing details of the power mechanism for imparting an angular movement of the brake holding tube of our invention.

Figure 1:
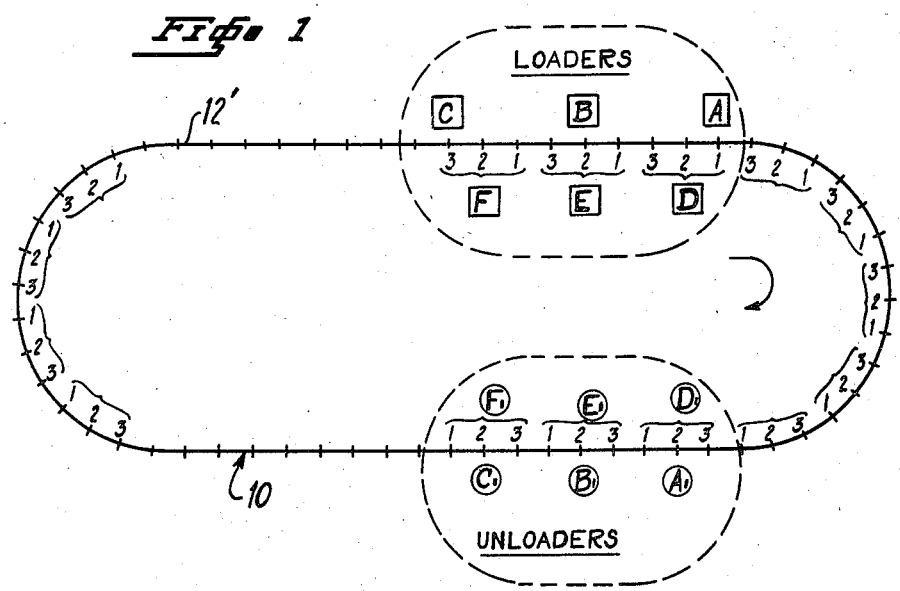
Figure 1 is a view disclosing, in a diagrammatic manner, the loader, unloader, conveyor mechanism described herein, the unloader mechanism of which constitutes our invention.

Referring now to the several figures of the drawings disclosing a preferred embodiment of our invention there is diagrammatically disclosed in Figure 1 a loader, unloader and conveyor mechanism, the unloader portion of which constitutes the essence of said invention. The conveyor system of this mechanism preferably includes an endless elliptically shaped I-beam track 10, Figures 1 and 2, which serves as a support for a plurality of equally or substantially equally spaced trolleys or carrier units each comprising a roller, not shown, to which is pivotally secured a hanger 14, Figure 2, and further comprising a hook member 16 secured to the lower end of the hanger, each hook having two prongs lying in a plane which is perpendicular or substantially perpendicular to the plane of that portion of the I-beam upon which the trolley is mounted. One of the two prongs projects outwardly of the track 10 and the other of the prongs projects inwardly all as is disclosed in Figure 1. The trolley units are preferably moved around the track 10 by a power operated endless chain 18 the hanger 14 of each unit extending through said chain.

Referring again to the diagrammatic showing of Figure 1, the trolleys, for convenience, are indicated by the numeral 12'. This figure also diagrammatically discloses the loader and unloader mechanisms, the loaders being indicated by the capital letters A to F inclusive each enclosed by a square; and corresponding unloader units are indicated by capital leters A' to F' inclusive each enclosed by a circle. The loader units, all of which are alike, are not disclosed in detail in this specification inasmuch as the invention herein deals only with the unloader mechanism. The loader units are disclosed in detail in our aforementioned parent application Serial No. 491,738.

Each of the letters in Figure 1 also indicates a particular type of piece part, that is work unit being processed such as a particular type of automobile brake or other unit such as a container of some sort; and each of the loaders and unloaders is positioned in Figure 1 opposite a certain numbered trolley. The loader A, for example, will load a Ford brake on the first of a sequence of three trolleys passing this particular loader; and loader B will load say, a Chevrolet brake on trolley number two, the second trolley of the bracketed one to three sequence of trolleys of Figure 1. It is to be stressed here that the mechanism of our invention is not limited to the particular type of unit processed, that is loaded upon the conveyor as desired and then unloaded as desired. The endless conveyor may be located in a manufacturing plant or other building; or it may be located out of doors, there being no limitation as to the length of the conveyor, where it may be located, and what it may convey. In the embodiment of our invention disclosed in this application a plurality of types of automobile brakes are processed, the particular unloading mechanism constituting our invention being constructed and operative to unload several types of automotive brakes upon a conveyor. All of the loaders of the mechanism of Figure 1 are encircled by a dotted line, as are the unloaders; however, said loaders and unloaders are not necessarily so grouped together for they may be intermixed.

Discussing now a feature of our invention, to insure the desired efficiency and effectiveness of the mechanism, particularly the undesired unloading of the units transported, the conveyor mechanism includes a certain number of trolley units said number being a multiple of a certain number; however, the particular number of trolleys may if desired, be changed to correspond with a relatively slight change in the construction of the loader and unloaders, all of which will be brought out in the description to follow. Explaining the fact that the number of trolleys is a multiple of a certain number, if there are say three types of automobile brakes to be conveyed on the outwardly extending prongs of the hook 16 then the total number of trolley units is a multiple of the number three; and if, as diagrammatically disclosed in Figure 1, the inwardly extending prongs are also employed to transport three more types of brakes, then the number of trolley units remains a multiple of three.

As indicated above, a feature of our invention lies in the construction and operation of the mechanism of Figure 1 whereby the types of units to be unloaded from the conveyor are unloaded in a certain sequence. Thus with the embodiment of our invention disclosed in Figure 1, where three types of brake units are processed, the sequence is any one of one, two, three; two, three, one; or three, one, two, that is one sequence; and the construction and arrangement of the units of the mechanism is such that the unloading mechanism, the unloader units of which correspond to the loader units of the loading mechanism, operate to unload the products in the same sequence as said products are loaded. Thus, as is disclosed in Figure 1, the circled unloaders A', B' and C' unload the brakes in the same sequence that the squared loader units A, B and C load the brakes. The sequence may, as will be apparent from the description to follow, be some other number, say 4 or 6. It is to be particularly noted that in order to effect the desired unloading operation it is necessary that the loaders and unloaders of our invention operate in a certain sequence and that the number of trolleys be a multiple of said sequence number; and the number of types of work units which can be handled is also a multiple of the product of the sequence number times two if loaders and unloaders are placed both inside and outside the conveyor; that is opposite both prongs of the hooks.

Describing now unloader unit A', which description will suffice for all of the unloader units A' to F' inclusive, this unit is disclosed in part in Figures 2, 3, 4, 5, 7 and 11 of the drawings. Referring to Figure 11, disclosing one of the principal controls of this unloader unit, a frame structure 110, secured to the I-beam track member 10, supports a pawl and ratchet switch operating mechanism lying inside the confines of said track said mechanism including a ratchet 112 pivotally mounted upon a pin 114 secured to a portion of said frame structure. A ratchet operating pawl 116 of the mechanism is pivotally mounted on a crank 118 which is also pivotally mounted on the pin 114; and said crank extends outwardly toward the track the end portion of the crank lying in the path of the hanger 14 of the trolley unit. A pawl operating spring 120, wound around a portion of the ratchet, is secured at one of its ends to the crank and at its other end to the pin 144. A normally open switch 122, no claim to which is made, is mounted on a portion of the frame structure 110; and this switch is closed by a lever 124 pivotally mounted on the frame. As will be described hereinafter the switch 122, when closed, initiates the cycle of operations of unloader A, Figure 1, to unload the Ford front brakes which were placed upon the conveyor by the above described loader A. Continuing the description of the ratchet mechanism the switch operating lever 124 is actuated by pins 126 secured to and extending downwardly from the bottom of the ratchet 112 there being one pin for every third tooth of the ratchet. Thus the switch 122 is closed every third time the ratchet is operated.

Describing now the operation of the switch operating pawl and ratchet mechanism, assuming the trolleys are moving in the direction of the arrows of Figures 1 and 11, then when a trolley contacts the crank 118 the latter is rotated clockwise thereby winding up the spring 120. Then when the trolley leaves the crank the ratchet, by the operation of the pawl 116, rotates in the direction of an arrow B thereby closing the switch 122 with every contact of a pin 126 with the lever 124. A pawl 128 serves to hold the ratchet in place when the crank 118 is being actuated by the trolley. It is to be particularly noted that with the embodiment of our invention disclosed in the drawings the switch 122 of Figure 11 is closed only by the number one trolley, that is the first of the three trolleys going to make up the aforementioned sequence. It follows therefore that the number of teeth on the ratchet 112 of Ford front brake unloader A', that is the unloader now being described, must be either three or a multiple thereof; and it also follows that there is one pin 126 on said ratchet for every three ratchet teeth. There is thus provided, by the switch operating trolley operated ratchet 112 and cooperating parts, that part of the unloader mechanism which initiates the operation of said mechanism; accordingly, the pawl and ratchet and crank unit may, together with the switch 122 be termed a signaling mechanism of said unloader mechanism.

Describing now the remainder of the unloader mechanism A', the closing of the so-called signaling switch 122 initiates the operation of the mechanism for immediately removing the Ford front brake from the conveyor and depositing said brake in the desired location. This mechanism, the remaining electrical controls of which will be described hereinafter, includes a brake holding swingably mounted yoke mechanism 130, Figures 2 and 5 inclusive and Figure 7, having a cylindrically shaped pin 132 extending from one side thereof; and said pin is supported by a sleeve 133 pivotally mounted thereon. This sleeve is fixedly secured to an arm 134 which is fixedly secured to a sleeve 136; and this sleeve 136 is rotatably mounted on a pin 137 which is fixedly mounted on a U-shaped support bracket 138. The bracket 138 is secured to an upright 140 constituting part of the supporting frame structure of the unloader mechanism.

A hanger member 142, fixedly secured to the support 138 at its upper end, is pivotally secured, at its lower end, to a rod 144 which is pivotally secured, at its upper end, to the base of the yoke 130. The rod 144 and arm 134 serve to maintain the yoke in a vertical plane when the same is moved downwardly. As disclosed in Figures 2 and 7 spaced apart posts 146 are permanently secured to a top portion 148, Figure 7, of the yoke; and a hook member 150 biased downwardly by a spring 152, is pivotally mounted between said posts. As is disclosed in Figures 2 and 7, particularly the latter, a roller 154, mounted on supporting structure 156, strikes a cam shaped end portion 157 of the hook to rotate the same counterclockwise against the action of the spring 152 when the yoke is moved upwardly to its uppermost position.

As to the means for actuating the brake holding yoke said means include a double-acting pressure differential operated motor 158, Figures 2 and 12, pivotally mounted at one of its ends at 160 to the upright 140. The power element 162, Figure 12, of said yoke operating motor is pivotally connected at 164 to strap 165 secured to the arm 134.

The valve mechanism for controlling the motor 158, and solenoids for operating said valve mechanism, is disclosed in Figure 12 and includes a casing 166 rotatably housing a disk shaped valve member 168. The valve as a whole is indicated by the numeral 167. No claim is made to this valve mechanism. The valve member 168 includes semicircular shaped ducts 170 and 172; and said member is actuated by a pin 174 which is connected with a solenoid operated rod 176. The pin 174 extends through a slot in the casing 166. The casing is ported to the atmosphere at 178 and 180 and provided with ducts 182 and 184 connected, respectively, to conduits 186 and 188 connected with the motor 158; and a duct 190 in the casing 166 is connected with a conduit 192 which is preferably connected with any suitable source of air pressure. Describing the operation of the mechanism of Figure 12 energization of a solenoid 194 moves the valve member 168 to the position disclosed in said figure to vent one end of the motor 158 and connect the other end to the source of air pressure; and this operation serves to energize said motor to move the piston 162 in one direction. Energization of a solenoid 196 serves to operate the valve to energize the motor to move the piston in the opposite direction.

Describing the operation of the yoke 130 when the motor 158 is energized the yoke is moved downwardly from its uppermost position disclosed in Figure 2. The brake 26 is at this time approaching a position immediately in front of the yoke of the parts of the mechanism being so positioned and so operative that the signaling switch 122 is closed, to effect the energization of the motor 158, just before the brake is opposite the yoke. As stated above, the electrical controls of the unloader mechanism, including the aforementioned solenoids for operating the valve 168, will be described hereinafter. As disclosed in Figure 5, when the brake and yoke are in juxtaposition, that is when the brake has been moved to a position immediately in front of the downwardly moved yoke, the hook 150 slips over the edge of the backing plate of the brake to secure the brake to the yoke. As disclosed in Figure 3, the yoke and its brake are then moved upwardly as a unit by a reverse operation of the motor 158; and when the hook 150 strikes the roller 154 the hook is rotated thereby releasing the brake. Guide members 198 secured to the sides of the yoke, serve, together with the hook, to position the brake as the same is lifted upwardly.

Continuing the description of the Ford brake unloader mechanism A', a hollow tube member 200, including within its confines a relatively large double-acting pressure differential operated motor 202, Figure 8, and a latch controlled motor operated two-part brake supporting nose member 204, Figure 8, secured to the power element 206 of said motor, is operative first to take charge of the brake after it leaves the yoke and then deposit the same elsewhere, all as described hereinafter in this specification. The tube 200 also includes a cylindrical casing 208, Figure 8, housing a relatively long sleeve 210 which constitutes the principal body member of the aforementioned double-acting motor 202. Disk shaped members, mounted in the ends of the sleeve, complete the body of the motor; and to the power element 206 of the motor, through the medium of a rod 211, there is secured a twisted substantially helically shaped ribbon like rod 212 preferably rectangular shaped in cross-section. The rod 211 is preferably rotatably secured to the piston 206 and said rod is fixedly secured to the rod 212. The rod 212 extends between guide rollers 216 fixed in place at the end of the tube 200; and said rod is fixedly secured, at its outer end, to a plate 218, Figure 9, constituting one end of the two-part brake supporting mechanism or nose member 204. The plate 218 is secured to one end of a cylindrically shaped body member 220 which, at about its center, is sleeved over a disk member 222 which is provided with an opening to receive a pin 224. This pin is preferably rectangular in cross-section and extends through the member 220 and into an opening in a sleeve member 226 sleeved over the member 220. The sleeve member 220 is provided with a slot 228 to receive the pin 224 thereby providing means for moving the members 222 and 226 as a unit with respect to the member 220.

To the center of the disk 222 there is secured a pin 230 which extends through a cylindrically shaped member 232 which is slightly smaller than its housing; and to this pin there is secured a threaded stem 234 which extends through a washer member 236, a nut 238 serving to clamp the washer 236 and members 230 and 222 together as a unit. This unit and the member 220 constitute the two principal parts of the aforementioned two-part brake supporting nose member 204. The members 220 and 226 are recessed to receive a latch unit 240; and a spring 242 of said unit serves to bias a latch member 244 of the unit upwardly to a position where a flange portion 246 on the latch member is in contact with the front face of a flange 248 at the end of the member 226. A spring 250, which is compressed in the position of the parts disclosed in Figure 9, serves to bias the disk member 222 and the members 226, 232 and 236 connected thereto to the left with respect to the body member 220. The parts of the brake supporting nose member 204 are held in this spring compressed or spring cocked position of Figure 9 by a bell crank shaped latch member 252 having a hooked end portion which fits over a projection 254 extending from the upper end of the pin 224. The latch member 252 is biased downwardly, that is into its latched position disclosed in Figure 9, by a spring 256; and the member 252 is pivotally mounted at 258 on a flange 260 which is fixedly secured to the member 218.

Completing the description of the latch mechanism of Figure 9, finger members 262, Figures 9 and 10, are pivotally mounted in a recess in the member 232 and extend into a slot 263 in the member 220; and when the members 232 and 226 are moved as a unit to the left with respect to the member 220, these finger members are rotated counterclockwise to the dotted line position disclosed in Figure 9. The ends of the fingers then project outwardly to hold the brake unit in place on the nose unit 204; all as is disclosed in dotted lines in Figure 9. Explaining the operation of the latch mechanism more completely, the latch member 252 is moved counterclockwise, Figure 7, when an adjustable upper end portion 264 thereof is contacted by the back of the yoke 130; and this operation is effective just before the yoke reaches the end of its stroke in reaching its uppermost position.

Now when the latch 252 is released the spring 250 expands to move the flange 248 of member 226 into engagement with the latch 240. The parts are so positioned and constructed that the brake is released from the hook 150 immediately thereafter by the interaction of roller 154 and cam shaped surface 157; and the brake, now positioned over the nose 204, falls onto latch 240 releasing flange 248. Spring 250 then causes sleeve 226 and attached members to move outwardly as a unit projecting the fingers 262 and clamping the backing plate of the brake between the fingers and flange 248. If desired, two spaced apart raised portions 266, Figure 10, on the end of the member 220 serve to center the brake on the end of the nose.

There is thus provided a brake holding mechanism 204 on the end of the tube 200 said mechanism serving to clamp the brake onto the tube after the yoke has completed its job of moving the brake away from the conveyor. The latch 252 insures a holding of the spring 250 cocked thereby retaining fingers 262 in their retracted position for withdrawal from the brake backing plate after the brake has been deposited in the container. It should be noted that the latch 240 may be held depressed by the backing plate at the moment when spring 250 is compressed and would therefore be rendered incapable of latching flange 248 to hold the spring compressed. The latch 240 prevents the release of spring 250 and subsequent extension of fingers 262 unless a brake is actually present even though an operation of the unloader disengages the latch 252. This latter condition would occur if the hook to be unloaded carried no brake. The operation of the latching mechanism will be more completely described hereinafter in giving the complete description of the operation of the entire mechanism.

Mechanism is provided making possible a return operation of the nose operating motor 202 and an operation of a double-acting pressure differential operated motor 158' to return the tube 200 to its horizontal position, after and only after the part 226 is moved relative to the part 220 to effect a closing of the latches 240 and 252, 254 and a release of the brake; and this mechanism includes a bell crank lever stop member 257, Figure 7, pivotally mounted upon the lower end of a support 259 fixedly secured to the plate 218. The longer and horizontally extending arm of the lever 257 is in two parts, one on each side of the tube 200, said parts being connected by a strap 261 fitting around the tube. Describing the operation of the member 257, when the sleeve 226 of the brake supporting nose portion 204 is moved outwardly by the operation of the spring 250 and the nose portion 204 has been bodily moved a certain distance away from the pressure differential operated motor 202 by the operation of said motor, then a spring 267 operates to rotate said member 257 clockwise, Figure 7, thereby bringing an end portion 269 of said member opposite the end face of the tube. Then when the latch 252 is again closed, by moving the members 236, 232 and 226 with respect to the member 220, the bell crank like stop member 257 is rotated counterclockwise to move the end portion 269 clear of the tube.

As will be brought out in the complete description of the mechanism of our invention there is thus provided, in the lever 257, means for preventing a complete return operation of the motor 202 and an operation of the motor 158' to return the tube to its horizontal position, until after the part 220 is moved relative to the part 226 to engage the latch 252.

The tube 200 is preferably rotated about a pivot structure 268 by means of the double-acting air operated motor 158', Figures 8 and 14, said motor being controlled by a solenoid operated valve 167a which duplicates the valve 167 disclosed in Figure 12 and heretofore described; and the motor 158' is a duplicate of the previously described motor 158. As to the force transmitting means interconnecting the motor 158' and tube 220, a rod 270, Figure 14, connects the power element 162' of the motor with a rack 272; and this rack is meshed with a pinion 274 which is pivotally mounted on a shaft 276 extending from a standard 278. To a crank pin 280 mounted on the pinion there is pivotally connected a rod 282 which is pivotally connected at one of its ends to a lever like crank 284. This crank is fixedly connected at 286 and at 288 to the tube 200. Tube 200 is pivotally mounted to support member 292 at 288 and 290.

Describing the operation of the mechanism of Figure 14, energization of the motor 158' in one direction will effect a ninety degree rotation of the tube 200 about its pivot 268 in one direction; and energization of the motor in the other direction will effect a rotation of the tube in the other direction.

Describing now the electrical controls of the above described unloader mechanism, that is unloader unit A, Figure 1, said controls are disclosed in Figures 6, 8a, 8 and 7. The aforementioned signal switch 122 is electrically connected with the hot wire 291 of the secondary 292 of a transformer 294. The primary of said transformer is indicated by the reference numeral 296. As is disclosed in Figure 6, the hot wire 291 is electrically connected with the normally open section 298 of a single pole double throw switch 300, the normally open switch 122, a normally closed safety switch 302 closed by the operation of the tube 200 in moving to its horizontal position, and the aforementioned valve operating solenoid 196 which is connected with the ground of the secondary 292; and these switches are connected in series. The switch 300, in addition to the normally open section 298 thereof includes a normally closed section 299. The switch 300 is said to be depressed when the switch section 298 is closed and the switch section 299 is open; and the switch 300 is said to be released when the switch section 298 is open and the switch section 299 is closed. A spring, not shown, biases the switch 300 to its released position. The switch 302 is biased to its open position by the operation of a spring 201; however, when the tube 200 is in its horizontal position a lever 304 is actuated by the tube to overcome the spring 201 thereby effecting a closing operation of the normally closed switch 302.

As disclosed in Figure 7, the switches 300 and 302 are suitably mounted on the framework of the mechanism of our invention. The normally open section 298 of switch 300 is closed by the mechanism disclosed in Figure 7 which includes a bell crank lever 306 pivotally mounted upon a pin 308 mounted in a support member 310. As is disclosed in Figures 2 and 5, the lower end of lever 306 includes two prongs which straddle the lever 252. A spring 312, interposed between one end of the lever 306 and a lever 314 pivotally mounted on the pin 308, cooperates with a spring 316, interposed between the lever 306 and a fixed support 318 secured to the lower end of the support 310, in controlling the operation of the switch 300. The springs 312 and 316 are preferably of equal rate the springs and associated parts being so positioned and constructed that when the tube with its nose 204 is in its vertical position the switch section 298 is closed.

Describing the operation of the switches 302 and 300, as the tube 200 is about to reach its horizontal position in the process of being rotated from its vertical position, it strikes the lever 304 to close the switch 302 and also strikes the lever 314 to compress the spring 312 and 316 without disturbing the switch 300 which is at that time depressed; furthermore, in the last increment of movement of the tube in reaching its horizontal position an upper edge portion of the nose member 204 strikes an end portion A of the lever 306; and this results in an operation of the levers 314 and 306 to further compress the spring 312 without disturbing the switch 300. Thereafter, when the latch 252 is released and the brake 26 falls on the latch 240 to release the same, the spring 250 expands to move the member 226 away from the lever end portion A; and this results in an immediate expansion of the then substantially compressed spring 312 thereby rotating the lever 306 in a clockwise direction, Figure 7. This results in an operation of the switch 300 to complete an electrical circuit including a grounded solenoid 322, Figures 6 and 8, which operates the valve 167a to initiate an operation of the motor 158' to rotate the tube to its vertical position. It is to be mentioned here that in this operation after the tube leaves the switch operating lever 304 the spring 316 expands to depress the switch 300 the levers 306 and 314 and spring 312 moving counterclockwise as a unit.

Continuing the description of the electrical controls of our invention and referring to Figure 8 of the drawings, the pressure differential operated motor 200 is controlled by a valve 167b which duplicates the valves 167 and 167a. The valve 167b is actuated by grounded solenoids 324 and 326 which are controlled by a hold down relay switch mechanism 328 and a normally open switch 330 which is closed by the tube 200 when and only when said tube is in its vertical position. Describing the relay switch 328 and its operating means the relay, indicated as a whole by the reference numeral 332 and outlined in dotted lines in Figure 8, includes a coil 334 and an armature 336 the latter being connected, by a rod 338, with a normally open hold down switch 340. The switch 340 constitutes the controlling switch of the relay. The rod 338 is also connected to the switch mechanism 328 which includes a normally open switch 344 and a normally closed switch 346. The switch 328 constitutes the controlled switch of the relay.

The switch 344 is connected in series with the grounded solenoid 324, the switch 330, and a grounded secondary winding 348 of a transformer 350 the primary winding of which is indicated by the numeral 352. The secondary winding 348 is connected in series with a grounded solenoid 354 which in part controls the valve 167a, and a normally open switch 356 which is operated in the manner described hereinafter. The relay coil 334 is preferably connected, by a conductor 358, to conductor Y from the source of electrical power; and said coil is also connected, by a conductor 360, with a normally open switch 362 which is connected, by a conductor 364 to conductor X from the source of electrical power. As is disclosed in Figures 8 and 13, the normally open switch 362 is momentarily closed by a spring return lever member 366 which is rotated a relatively short distance by a pin 368 mounted on the body of the tube 200. As the tube 200 moves toward its vertical position in the operation of the mechanism described hereinafter, the pin 368 strikes the end of the lever 366, Figure 13, and rotates said lever sufficiently to momentarily close the switch 362. Continued movement of the tube toward its completely vertical position results in a sliding of the pin 368 off of the end portion of the lever 366 thereby permitting a spring 370 to rotate said lever away from the switch 362 and permit the latter to return to its normally open position. When the tube 200 reaches its completely vertical position, the body of the same strikes the switch 330, Figures 8 and 13, and closes the same.

The complete operation of the mechanism of our invention will now be described; and this description will cover parts of the mechanism not heretofore described.

It is to be remembered that this description covers the operation of the above described unloader A' of Figure 1; and the concurrent operation of the loader A; however, this description will suffice for all of the loaders and unloaders of the mechanism inasmuch as all of the loaders are alike and all of the unloaders are alike. It is also to be remembered that both the loaders and unloaders operate in the same sequence.

Referring to Figures 1 and 2 of the drawings, it will be assumed that the conveyor is in operation, that is the chain 18 and parts connected thereto are being moved around the track 10 in the direction of the arrow in Figure 1. A hook is now approaching the loader A and this hook, immediately before it reaches the loader, enters a guide member 374, Figure 2, which is secured to the track 10. The loader then operates to place a brake upon the hook.

The hook, having been loaded with a Ford front brake, continues its movement around the conveyor until it reaches the Ford front brake unloader A'; then when the hanger supporting said hook contacts the crank 118, Figure 11, the unloading operation is initiated. Describing this operation, immediately after the hanger has left the crank 118 said crank is rotated by the spring 120 to effect a momentary closing of the signal switch 122; and this operation, through the intermediary of the then closed section 298 of switch 300, the then closed switch 302 and the grounded solenoid 196, Figure 6, results in an operation of the valve 167, Figure 12. As to the fact that the switch section 298 and switch 302 are at the time closed, it is to be remembered that the tube 200 is at the time in its horizontal position. The safety switch 302 provides a means preventing an operation of the yoke motor 158 when the tube 200 is in any position other than its horizontal position. The operation of the valve 167 results in an energization of the motor 158 to rotate the yoke 130 downwardly from the position of the yoke disclosed in Figure 2, the piston 162 of said motor being connected to the yoke operating linkage by a rod 382, Figure 12. The hook 150 then snaps over the brake as is disclosed in Figure 3 and at this time the piston 162 of the motor 158 has reached its lowermost position. Now in this position of the piston a cam 384, Figure 3, mounted on a rod 386 paralleling the motor 158, serves to close a normally open switch 388. This switch 388, Figure 6, is preferably fixedly secured to the framework of the mechanism and the rod 386 is secured at its end to a support 390 mounted on the rod 382. The piston 162, rod 382, support 390 and rod 386 move as a unit.

As is disclosed in Figure 6, when the switch 388 is closed the solenoid 194 is energized to operate the valve 167; and this results in a reversal of operation of the motor 158 to immediately return the yoke 130 with its brake unit to its upper position disclosed in Figures 2, 4 and 5. As described above, just before the yoke reaches its uppermost position the latch 252, Figure 7, is unlocked; and very shortly thereafter when the hook 150 strikes the roller 154 the brake unit is dropped upon the latch 240 to unlock the same. This latch unlocking operation permits the outward movement of the nose members 226 and 232 and this results in a locking of the brake upon the end of the nose 204 and an operation of the lever 306 and springs 312 and 316 to release the switch 300. This release operation, that is the closure of section 299 of switch 300, results in an operation of the valve 167a; and this results in an operation of the motor 158', Figure 8, to move the tube downwardly toward its vertical position to unload the brake. Just before the tube reaches its vertical position the pin 368 strikes the crank 366 to momentarily close the switch 362; and the resulting operation of the relay 332 results in a closure of the switches 344 and 340. As disclosed in Figures 8 and 8a, the then energized coil 334 of the relay remains energized by virtue of a so-called hold down circuit including the secondary winding of the aforementioned transformer, not shown, a normally closed switch 400, and the switch 340. The switch 400 and its operation is described hereinafter. Now the switch 344 lies in one of the two electrical circuits including the switch 330 and when the latter is closed, by the body of the tube upon reaching its vertical position, then the solenoid 324 is energized. The energization of the latter solenoid results in an operation of the valve 167b to operate the motor 202 to move the piston 206 and parts connected thereto downwardly, Figure 8. It is to be remembered here that immediately after the tube 200 starts its downward movement the switch section 298 of the switch 300 is closed thereby, in part, preparing the valve controlling electrical circuit for again operating the yoke 130.

Continuing the description of the operation of the tube motor 202, the first increment of downward movement of the piston 206, Figure 8, results in the operation of a spring 392 to rotate a bell crank lever 393 counterclockwise; and this operation results in the operation of a bell crank lever 394 clockwise to the dotted line position A. The lever 393 is pivotally mounted on the casing 208 of the tube 200; and the lever 394 is pivotally mounted on a part of the framework of the mechanism. Continued downward movement of the piston 206 results in an operation of the spring 392 to rotate the lever 393 past the lever 394 thereby permitting the latter to drop, by gravity, back to a position B, it being held in this position by the spring, not shown, of the normally open switch 356.

Now during this nose down operation of the motor 202, the nose 204 with the brake 26 mounted thereon is being moved downwardly into a brake container, not shown, the nose and brake being rotated, as they move downwardly, by virtue of the operation of the rollers 216 and the cooperating helically shaped connecting rod 212. This rotating operation serves to properly position the brake in the container. When the brake strikes the bottom of the container or a previously deposited brake in said container, movement of the nose member 226, Figure 9, and members connected thereto is stopped; however, the nose member 220 continues its movement downwardly through the center hole of the brake by virtue of the operation of the piston 206. With this operation the spring 250 is compressed until the member 220 is stopped by the pin 224. At this time movement of the piston 206 is stopped and the latch 252, 254 is again locked. Then when the fluid pressure in a chamber 396 of the motor 202 reaches a certain factor, a pressure differential and spring operated switch operating member 398 is moved upwardly, Figure 8, to open the normally closed switch 400 in the hold down circuit of the relay 332. Opening of the switch 400 results in a de-energization of the relay thereby permitting an armature spring 402 of the relay to expand to open the switch 340, open the switch 344 to de-energize the solenoid 324, and close the switch 346. The closing of the latter switch results in an energization of the solenoid 326 and this results in an operation of the valve 167b to effect an energization of the motor 202 to move the piston 206 upwardly.

As to the unloader mechanism, it is to be noted that the power means and electrical controls of our invention provide means to successively move a yoke downwardly to pick up a brake, move said yoke with its brake upwardly to deposit the brake on the end of a tube, that is the nose 204, move the tube with its brake from a horizontal that is starting position to a vertical position to deposit the brake in a container, the tube nose operating motor within the tube coming into operation just as the tube approaches its vertical position, again operate the nose operating motor in the operation of preparing the mechanism for another brake unloading cycle of operations, and lastly returning the tube to its horizontal that is starting position.

There is thus provided an efficient and effective mechanism for transporting a plurality of different types of units, such as brakes, from one location to another, said units being loaded by power operated means onto a conveyor in a certain sequence and unloaded by power means in sequence such that like units only are unloaded at a particular unloading station. The conveyor, that is power operated loader units of our conveyor, loader and unloader mechanism, may be conveniently located in one area of say a manufacturing plant; and the power operated unloader units of our mechanism may be conveniently located in another area of said plant.

We claim:

1. A power operated unloader mechanism adapted for use in a brake conveyor mechanism, said unloader mechanism including a support structure, a brake supporting yoke swingably mounted on said support structure by means including an arm pivotally mounted on the support structure, and adapted to take a brake from a conveyor, a brake supporting cylindrical tube pivotally mounted on the support structure and adapted to be moved to a horizontal position having one of its ends adjacent the yoke and positioned to receive the brake from the yoke; power means, including a pressure differential operated motor having its casing pivotally mounted on the support structure and its power element operably connected to the arm, for moving the yoke away from the support structure in the operation of picking up a brake and then moving the yoke with its brake back toward the support structure and toward the aforementioned end of the tube; power means, including a pressure differential operated motor fixedly mounted on the support structure, for imparting an angular movement of the tube from its horizontal position, where it receives the brake from the yoke, to a vertical position where it deposits the brake in a desired location; power means housed within the tube for operating a part of the tube structure in preparation for the operation of transferring the brake from the yoke to the tube, and means for controlling the operation of the several different power means.

2. A power operated unloader mechanism adapted for use in a brake conveyor mechanism, said unloader mechanism including a support structure, a brake supporting yoke swingably mounted on said support structure and adapted to take a brake from a conveyor, and a brake supporting tube pivotally mounted on the support structure and adapted to be moved to a horizontal position having one of its ends adjacent the yoke and positioned to receive the brake from the yoke; power means, including a pressure differential operated motor pivotally mounted on the support structure, for moving the yoke away from the support structure in the operation of picking up a brake and then moving the yoke with its brake back toward the support structure and toward the aforementioned end of the tube; power means, including a pressure differential operated motor fixedly mounted on the support structure, for imparting an angular movement of the tube from a horizontal position where its aforementioned end position receives the brake from the yoke, to a vertical position where it deposits the brake in a desired location; power means housed within the tube for operating a part of the tube structure in the operation of transferring the brake from the yoke to the tube, and electrical means, including a plurality of power operated switches, for controlling the operation of the several power means.

3. A mechanism for unloading workpieces from a conveyor including a plurality of trolleys, said mechanism including a support, a workpiece carrying yoke swingably mounted on said support, a tube unit, comprising a workpiece carrying nose member comprising two relatively movable parts, pivotally mounted on said support and adapted to be moved to a position adjacent the yoke to have said nose member receive the unit, power means for operating the yoke, tube and nose members including a fluid pressure operated motor for operating the yoke said motor being pivotally mounted on the support and having its power element operatively connected to the yoke, a fluid pressure operated motor for angularly rotating the tube said motor being fixedly mounted on the support, and a fluid pressure operated motor, mounted within the tube, for operating the nose member; and means, including electrical means, for controlling the operation of said motors, said electrical means including means for controlling the operation of the yoke operating motor, means for in part controlling the operation of the tube operating motor, and means for controlling the operation of the nose member operating motor and in part controlling the operation of the tube operating motor comprising a hold down relay including a controlled switch mechanism, a switch operated by the tube, and a source of electrical power, the controlled switch mechanism of the relay, the tube operated switch and the source of electrical power being electrically connected in series, said last mentioned means further including a switch operated by the piston of the tube operating motor when the piston is in a certain position and a valve operating solenoid for in part controlling the tube operating motor said solenoid and switch being electrically connected in series with the aforementioned source of electrical power.

References Cited in the file of this patent

UNITED STATES PATENTS

| | | |
|---|---|---|
| 1,856,976 | Strelow | May 3, 1932 |
| 2,702,135 | Knapp | Feb. 15, 1955 |
| 2,741,381 | Bezien | Apr. 10, 1956 |